United States Patent
Kato

(10) Patent No.: US 8,321,089 B2
(45) Date of Patent: Nov. 27, 2012

(54) VEHICLE MOTION CONTROL DEVICE

(75) Inventor: Toshihisa Kato, Handa (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 203 days.

(21) Appl. No.: 12/822,355

(22) Filed: Jun. 24, 2010

(65) Prior Publication Data

US 2010/0332071 A1 Dec. 30, 2010

(30) Foreign Application Priority Data

Jun. 30, 2009 (JP) ................... 2009-155805

(51) Int. Cl.
| | |
|---|---|
| G06F 7/00 | (2006.01) |
| G06F 17/00 | (2006.01) |
| G06F 19/00 | (2006.01) |
| B60G 17/016 | (2006.01) |
| B60G 23/00 | (2006.01) |
| B62C 3/00 | (2006.01) |
| B62K 25/00 | (2006.01) |
| B60T 7/12 | (2006.01) |
| G05D 1/00 | (2006.01) |

(52) U.S. Cl. .......................................... 701/38; 701/90

(58) Field of Classification Search .................... 701/38, 701/90

See application file for complete search history.

(56) References Cited

U.S. PATENT DOCUMENTS

| | | | | |
|---|---|---|---|---|
| 4,779,696 | A | * | 10/1988 | Harada et al. ................. 180/197 |
| 5,001,640 | A | * | 3/1991 | Matsumoto et al. ............ 701/77 |
| 7,337,047 | B2 | | 2/2008 | Ueno et al. |
| 7,392,127 | B2 | * | 6/2008 | Kato et al. ...................... 701/70 |

FOREIGN PATENT DOCUMENTS

JP 4084248 B2 2/2008

* cited by examiner

*Primary Examiner* — Thomas Tarcza
*Assistant Examiner* — Kevin Myhre
(74) *Attorney, Agent, or Firm* — Buchanan Ingersoll & Rooney PC

(57) ABSTRACT

The vehicle motion control device obtains a physical quantity representing a state of a motion of a vehicle in a direction of a lateral overturn. When the obtained physical quantity is larger than or equal to a motion state threshold and the vehicle motion control device is thereby in an anti-lateral overturn, the vehicle motion control device determines the target slip ratio at a present calculation period based on a largest value of the slip ratio corresponding, according to the predetermined relation between the physical quantity and the slip ratio, to the physical quantity obtained during a time range between the present calculation period and a past time instance when the vehicle motion control device enters the anti-lateral overturn mode.

9 Claims, 7 Drawing Sheets

RELATED ART

RELATED ART

VEHICLE MOTION CONTROL DEVICE

CROSS REFERENCE TO RELATED APPLICATION

This application is based on and incorporates herein by reference Japanese patent applications No. 2009-155805 filed on Jun. 30, 2009.

FIELD OF THE INVENTION

The present invention relates to a vehicle motion control device for setting a target slip ratio based on a state of motion of a vehicle in a direction of lateral overturn, controlling actual slip ratio, and accordingly suppressing lateral overturn of the vehicle.

BACKGROUND OF THE INVENTION

In Japanese Patent No. 4084248, brake control for a vehicle is described which sets a target slip ratio of a front outside wheel to a value higher than a normal value and controls the brake force at the front outside wheel based on the target slip ratio when a vehicle is under an avoidance maneuver operation in emergency, wherein the target slip ratio is higher than that in a spin control which works when a friction coefficient (hereinafter referred to as μ) of a surface of a road is high. More specifically, a correction coefficient is set to a higher value in order to correct the target slip ratio to a higher value as an inertia moment corresponding to an acceleration in the lateral direction of the vehicle (hereinafter referred to as a lateral acceleration) becomes larger.

FIG. 8 is a graph showing a relation between the slip ratio and the lateral acceleration of the front outside wheel. The characteristics of the graph depend on characteristics of a tire, state of a surface of a road, the total weight of the vehicle, and the like. FIG. 9 is a graph showing a relation between the lateral acceleration and a roll angle of the vehicle.

As shown in FIG. 8, the lateral acceleration reaches its peak value when the slip ratio becomes a certain value (approximately 5% in FIG. 8) and decreases as the slip ratio becomes larger beyond the certain value. As shown in a line 31 in FIG. 9, the lateral acceleration is proportional to the roll angle until the vehicle comes into a state where there is a possibility of the lateral overturn. Therefore, the lateral acceleration can be a parameter indicating the roll angle, which means that the roll angle becomes large as the lateral acceleration reaches its peak value. A region 32 is a region in which the lateral overturn is highly possible.

If the target slip ratio for the front outside wheel is set to a high value as in Japanese Patent No. 4084248, the target slip ratio becomes larger than a value of the target slip ratio at which the lateral acceleration reaches at its peak value. Therefore, the lateral acceleration can be suppressed if the actual slip ratio is controlled so that it becomes equal to the target slip ratio. FIG. 9 also shows an example of an anti-lateral overturn control in which the front outside wheel is forced to slip and the lateral acceleration accordingly decreases from a region 33 to a region 34.

However, the target slip ratio becomes larger as the inertia moment (i.e. lateral acceleration) becomes larger in Japanese Patent No. 4084248. Therefore, when the high target slip ratio causes the lateral acceleration to decrease, the correction coefficient changes in accordance with the decrease of the lateral acceleration, and the target slip ratio also changes to the lower value in accordance with the change of the correction coefficient. As a result, the lateral acceleration gets closer to its peak value in accordance with the decrease of the target slip ratio, and the roll angle accordingly becomes larger. When the roll angle gets larger, it becomes more likely that the roll angle reaches a roll limit value 30 at which the lateral overturn of the vehicle possibly occurs. In other words, the lateral overturn cannot be suppressed sufficiently. Especially in the case that the loading weight of the vehicle becomes larger and that the total weight of the vehicle accordingly becomes larger, the peak value of the lateral overturn in FIG. 8 also becomes larger. Therefore, it becomes more difficult to suppress the lateral overturn sufficiently.

SUMMARY OF THE INVENTION

It is therefore an object of the present invention to provide a vehicle motion control device which can make it more unlikely that the roll angle reaches the roll limit value and accordingly make the anti-lateral overturn control more effective.

In an aspect of the present invention, a motion state obtaining means obtains, once per a predetermined calculation period, the physical quantity representing the state of the motion of the vehicle in the direction of the lateral overturn. When the obtained physical quantity is larger than or equal to a motion state threshold and the vehicle motion control device is thereby in an anti-lateral overturn, a target slip ratio setting means determines the target slip ratio at a present calculation period based on a largest value of the slip ratio corresponding, according to the predetermined relation, to the physical quantity obtained during a time range between the present calculation period and a past time instance when the vehicle motion control device enters the anti-lateral overturn mode.

As is described above, the vehicle motion control device sets the target slip ratio based on the largest value of the slip ratio corresponding to the physical quantity within the time range in which the vehicle motion control device is in the anti-lateral overturn mode. Therefore, if the actual slip ratio becomes closer to the target slip ratio and the physical quantity accordingly decreases, the target slip ratio is not updated by the decreased physical quantity. Therefore, the actual slip ratio can be maintained at a high value. Thus, the vehicle motion control device can actively generate lateral slip and thereby keep the vehicle skidding while the vehicle motion control device is in the anti-lateral overturn mode.

Therefore, it is possible to make an occasion unlikely in which decrease of the actual slip ratio causes the physical quantity to increase and come closer to its peak value. Therefore, it is possible to make an occasion unlikely in which the roll angle reaches a roll limit value at which the lateral acceleration of the vehicle possibly occurs. Thus, it is possible to decrease possibility that the roll angle reaches the roll limit value and to enhance the effect of anti-lateral overturn control.

For example, the predetermined relation may relate the slip ratio to the physical quantity so that the slip ratio becomes larger as an absolute value of the physical quantity becomes larger. In addition, when the vehicle motion control device is in the anti-lateral overturn mode, the target slip ratio setting means may obtain a largest value of the absolute value of the physical quantity obtained during the time range and determine the target slip ratio at a present calculation period to be the slip ratio corresponding, according to the predetermined relation, to the obtained largest value of the absolute value of the physical quantity.

In this case, the target slip ratio can be determined based on the absolute value of the physical quantity obtained within the time range while the vehicle motion control device is in the anti-lateral overturn mode. In addition, an amount of calculation can be decreased since it is not necessary to calculate the slip ratio every time the physical quantity is obtained.

The vehicle motion control device may further include a temporary target slip ratio setting means for setting, each time when the physical quantity is obtained by the motion state obtaining means, a temporary target slip ratio to the slip ratio corresponding, according to the predetermined relation, to the obtained the physical quantity. In this case, the target slip ratio setting means may set, when the vehicle motion control device is in the anti-lateral overturn mode, the target slip ratio to a largest value of the temporary target slip ratio set by the temporary target slip ratio setting means during the time range.

Thus, the vehicle motion control device can calculate the temporary target slip ratio corresponding to the physical quantity every time the physical quantity is detected and set the target slip ratio to the largest value of the temporary target slip ratio.

The predetermined relation may relate the slip ratio to the physical quantity so that the target slip ratio becomes larger as a total weight of the vehicle becomes larger with the physical quantity fixed.

If the difference between the actual slip ratio and the slip ratio at which the physical quantity reaches its peak value becomes larger, the lateral overturn of the vehicle can be prevented with higher possibility, but the steerability of the vehicle deteriorates on the other hand. Therefore, a trade-off between prevention of lateral overturn and the steerability can be optimized by changing the relation between the physical quantity and the slip ratio based on the total weight of the vehicle.

In another aspect of the present invention, a motion state obtaining means obtains, once per a predetermined calculation period, the physical quantity and the actual slip ratio actually being generated at the wheel of the vehicle. When the obtained physical quantity is larger than or equal to a motion state threshold and the vehicle motion control device is thereby in the anti-lateral overturn mode, a target slip ratio setting means sets a reference slip ratio to the actual slip ratio obtained when the physical quantity reaches a largest value within a time range between the present calculation period and a past time instance when the vehicle motion control device enters the anti-lateral overturn mode, and also determines the target slip ratio at the present calculation period based on the reference slip ratio.

The slip ratio at which the physical quantity reaches its peak value (see the relation between the actual slip ratio and the physical quantity in FIG. 8) changes depending on characteristics of a tire of the wheel, steering angle of the vehicle, and state of a surface of a road beneath the vehicle. Therefore, in view of the trade-off between prevention of lateral overturn and the steerability which is described in connection with the total weight of the vehicle, it is possible to determine a proper target slip ratio.

For example, the target slip ratio setting means may set the target slip ratio to the sum of the reference slip ratio and a predetermined value.

In this case, the predetermined value may become larger as a total weight of the vehicle becomes larger. If the difference between the actual slip ratio and the slip ratio at which the physical quantity reaches its peak value becomes larger, the lateral overturn of the vehicle can be prevented with higher possibility, but the steerability of the vehicle deteriorates on the other hand. Therefore, a trade-off between prevention of lateral overturn and the steerability can be optimized by changing the predetermined value based on the total weight of the vehicle.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
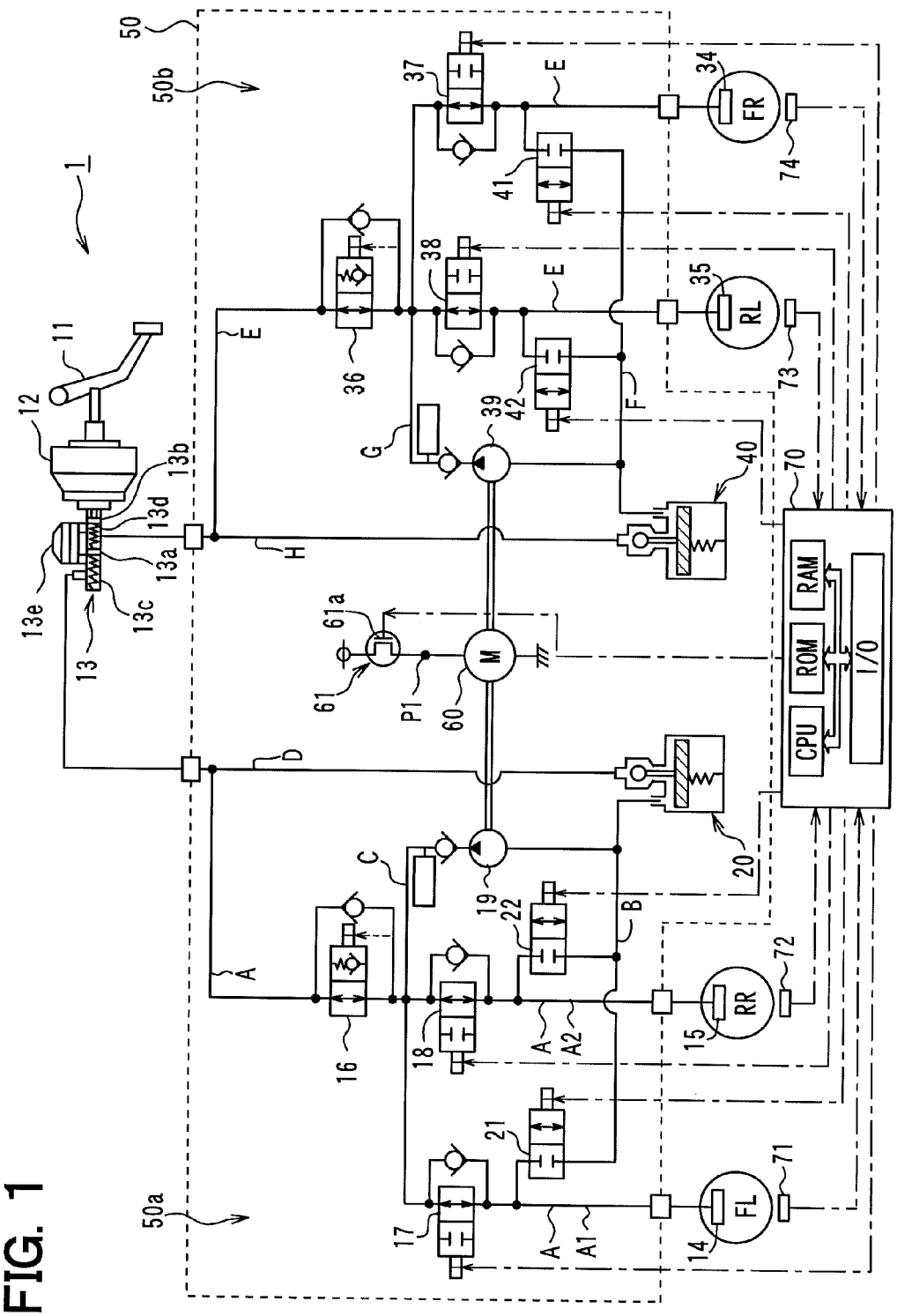
FIG. 1 is a diagram showing an overall structure of a brake control system for a vehicle which performs a vehicle motion control in a first embodiment of the present invention.

Hereinafter, preferred embodiments of the present invention will be described in detail with reference to the appended drawings. Note that elements that are the same or equivalent to each other in the following embodiments are denoted with the same reference numerals in the appended drawings.

First Embodiment

A first embodiment of the present invention will now be described. FIG. 1 is a diagram showing the overall structure of a brake control system 1 for a vehicle that realizes a vehicle motion control according to a first embodiment of the present invention. In the first embodiment, a case will be described in which an anti-lateral overturn control is performed as the vehicle motion control.

With reference to FIG. 1, when a driver depresses a brake pedal 11, the depression force is boosted by a servo unit 12, and pushes master pistons 13a, 13b located in a master cylinder 13. As a result, a same master cylinder pressure is generated in a primary chamber 13c and a secondary chamber 13d defined by the master pistons 13a, 13b. The master cylinder pressure is transmitted to respective wheel cylinders 14, 15, 34, and 35 through an actuator 50 for controlling brake fluid pressure.

The master cylinder 13 is provided with a master reservoir 13e having a passage that is in communication with the primary chamber 13c and the secondary chamber 13d.

The actuator 50 includes a first conduit system 50a and a second conduit system 50b. The first conduit system 50a controls brake fluid pressures applied to a left front wheel FL and a right rear wheel RR, and the second conduit system 50b controls brake fluid pressures applied to a right front wheel FR and a left rear wheel RL.

The first conduit system 50a and the second conduit system 50b have a similar structure. Accordingly, in the following description, only the first conduit system 50a will be explained and explanation of the second conduit system 50b will be omitted.

The first conduit system 50a includes a conduit A serving as a main conduit. The conduit A transmits the aforementioned master cylinder pressure to the wheel cylinder 14 provided at the left front wheel FL and the wheel cylinder 15 provided at the right rear wheel RR and thereby generates wheel cylinder pressures.

The conduit A includes a first differential pressure control valve 16 that can be controlled to a communicated state and a differential pressure state. The valve position of the first differential pressure control valve 16 is adjusted such that the first differential pressure control valve 16 is in the communicated state during a normal braking operation. In the normal braking operation, the driver depresses the brake pedal 11 and the vehicle motion control is not being performed. When an electric current is applied to a solenoid coil provided in the first differential pressure control valve 16, the valve position is adjusted such that the pressure difference becomes larger as the value of the electric current is increased.

When the first differential pressure control valve 16 is in the differential pressure state, the brake fluid is allowed to flow from the wheel cylinders 14, 15 side to the master cylinder 13 side only when the brake fluid pressure on the wheel cylinders 14, 15 side is higher than the master cylinder pressure by a determined pressure or more. Therefore, the brake fluid pressure on the wheel cylinders 14, 15 side is normally maintained not to become higher than the pressure on the master cylinder 13 side by the determined pressure or more.

The conduit A branches into two conduits A1 and A2 at the wheel cylinders 14, 15 side of the first differential pressure control valve 16 (i.e. downstream of the first differential pressure control valve 16). A first boost control valve 17 is provided in the conduit A1, and controls the increase in the brake fluid pressure to the wheel cylinder 14. A second boost control valve 18 is provided in the conduit A2, and controls the increase in the brake fluid pressure to the wheel cylinder 15.

The first and the second boost control valves 17, 18 are formed by a two-position electromagnetic valve that can be controlled to a communicated state and a closed state.

The first and the second boost control valves 17, 18 are normally open valves. More specifically, when a control current applied to solenoid coils provided in the first and the second boost control valves 17, 18 is zero (i.e. when no current is applied), the first and the second boost control valves 17, 18 are controlled to the communicated state. In addition, when the control current is applied to the solenoid valves, the first and the second boost control valves 17, 18 are controlled to the closed state.

A conduit B serving as a pressure reducing conduit connects a place in the conduit A between the first boost control valve 17 and the wheel cylinder 14 with a pressure adjusting reservoir 20, and connects a place of the conduit A between the second boost control valves 18 and the wheel cylinder 15 with the pressure adjusting reservoir 20. The conduit B is provided with a first pressure reducing control valve 21 and a second pressure reducing control valve 22 each formed by a two-position electromagnetic valve that can be controlled to a communicated state and a closed state. The first and the second pressure reducing control valves 21, 22 are normally closed valves.

Further, a conduit C serving as a reflux conduit is provided between the pressure adjusting reservoir 20 and the conduit A serving as the main conduit. The conduit C is provided with a self-priming pump 19 that is driven by a motor 60. The self-priming pump 19 sucks up brake fluid from the pressure adjusting reservoir 20 and discharges it to the master cylinder 13 side or the wheel cylinders 14, 15 side. Supply voltage to the motor 60 is controlled according to ON and OFF of a semiconductor switch 61a included in a motor relay 61.

Furthermore, a conduit D serving as an auxiliary conduit is provided between the pressure adjusting reservoir 20 and the master cylinder 13. The brake fluid is sucked from the master cylinder 13 through the conduit D by the pump 19 and is discharged to the conduit A. As a result, the brake fluid is supplied to the wheel cylinders 14, 15 side during a vehicle motion control such as an anti-lateral overturn control, a traction control (TCS) or the like, thereby increasing the wheel cylinder pressure of a target wheel.

Figure 2:
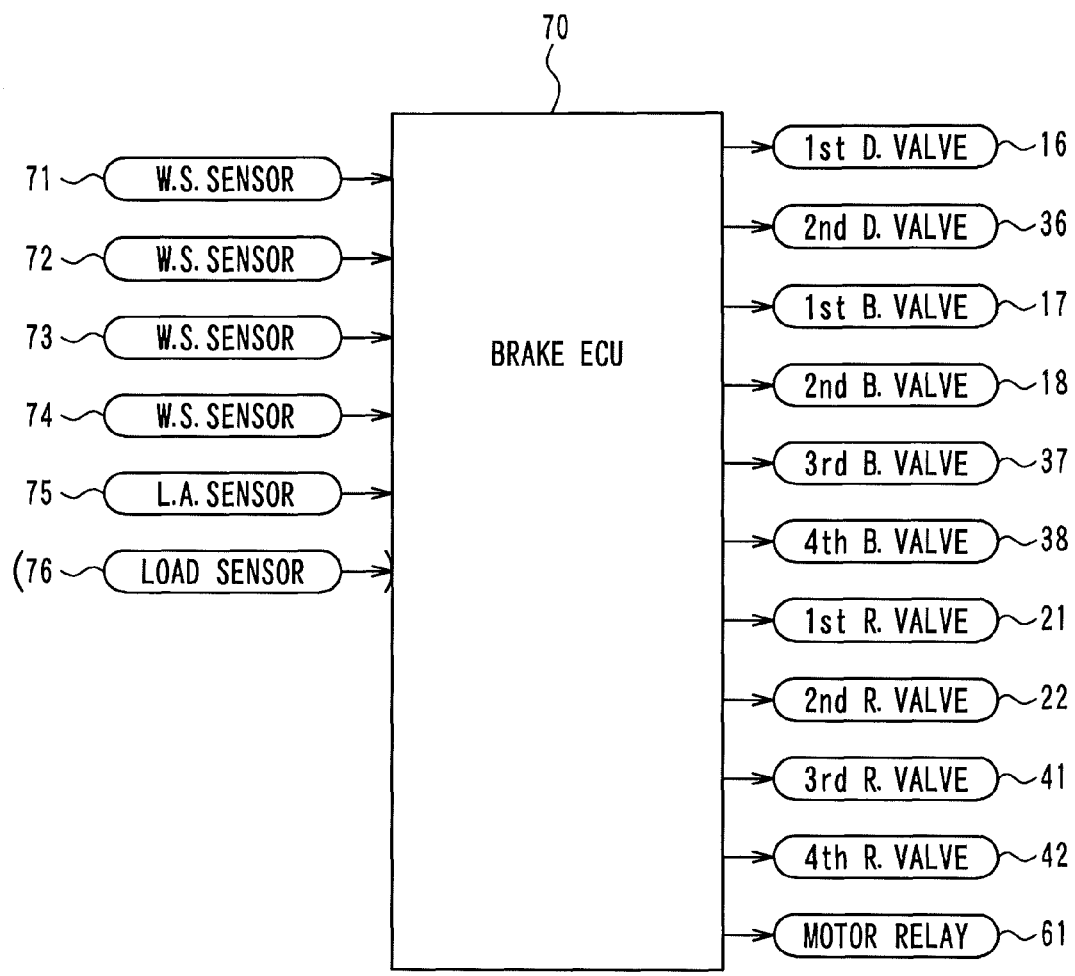
FIG. 2 is a block diagram showing input and output structure of a brake ECU.

A brake ECU 70, which corresponds to a vehicle motion control device of the present invention, controls a control section of the brake control system 1. The brake ECU 70 is a known microcomputer provided with a central processing unit (CPU), a read only memory (ROM), a random access memory (RAM), an input/output (I/O) port, and the like. The brake ECU 70 performs processing, such as various types of calculation, according to programs stored in the ROM and the like. FIG. 2 is a block diagram showing the relationship between the input and the output of a signal of the brake ECU 70.

As shown in FIG. 2, the brake ECU 70 receives detection signals from wheel speed sensors 71 to 74 provided at respective wheels FL to RR and a lateral acceleration sensor 75, and performs calculations of various types of physical quantities. For example, the brake ECU 70 calculates, based on the detection signals, the wheel speeds of the wheels FL to RR, a speed of the vehicle (i.e. an estimated speed of the body of the vehicle), slip ratios of the wheels, and a lateral acceleration. Based on the calculated physical quantities, the brake ECU 70 determines whether to execute the anti-lateral overturn control, selects a control target wheel to be under control of the anti-lateral overturn control, and calculates a control amount, that is, a W/C (wheel cylinder) pressure to be generated at the wheel cylinder corresponding to the control target wheel. Based on the above operation, the brake ECU 70 executes control for supplying electric currents to the control valves 16 to 18, 21, 22, 36 to 38, 41 and 42 and also controls amounts of the electric currents supplied to motor 60 for driving the pumps 19 and 39.

For example, in the case that the brake ECU 70 selects the left front wheel FL as the control target wheel and generates the W/C pressure at the wheel, the brake ECU 70 controls the first differential pressure control valve 16 to the differential pressure state, turns the motor relay 61 to ON, and drives the pump 19 by means of the motor 60. Then, the brake fluid pressure downstream (i.e. W/Cs 14, 15 side) of the first differential pressure control valve 16 increases because of the differential pressure generated at the first differential pressure control valve 16. At this time, the second boost control valve 18 corresponding to the right rear wheel RR as a non-control target wheel is closed so that the wheel cylinder 15 is not pressurized. In this state, in order to generate a desired W/C pressure at the W/C 14, the brake ECU 70 controls the first boost control valve 17 and a first pressure reducing control valve 21 which correspond to the left front wheel FL as the control target wheel.

More specifically, the brake ECU 70 properly switches between a depressurization mode, a pressure maintain mode and a pressure boosting mode to adjust the W/C pressures. In the depressurization mode, the first boost control valve 17 is controlled to the closed state and the first pressure reducing control valve 21 is switched between the communicated state and the closed state in a manner of duty control so that the W/C pressure is decreased. In the pressure maintain mode, the first boost control valve 17 and the first pressure reducing control valve 21 are controlled to the closed state so that the W/C pressure is maintained. In the pressure boosting mode, the first pressure reducing control valve 21 is controlled to the closed state and the first boost control valve 17 is switched between the communicated state and the closed state in a manner of duty control so that the W/C pressure is increased. Thus, an actual slip ratio Sa is controlled so that a desired target slip ratio Stag is achieved, wherein the actual slip ratio Sa is a slip ratio actually generated at a wheel.

It should be noted that the motor 60 drives the pump 39 as well as the pump 19. However, if the second differential pressure control valve 36 is not controlled to the differential pressure state, brake fluid is only circulated and the W/Cs 34, 35 are not pressurized.

The brake control system 1 of the present embodiment is constructed as above. Next, the specific operation of the brake control system 1 will be described. Note that the brake control system 1 can perform an anti-side slip (ABS) control and the like as a vehicle motion control, in addition to a normal brake control. The basic operations of these controls are the same as those of the related arts, so only the operation relating to the anti-lateral overturn control, which relates to a key feature of the present invention, will be described.

Figure 3:
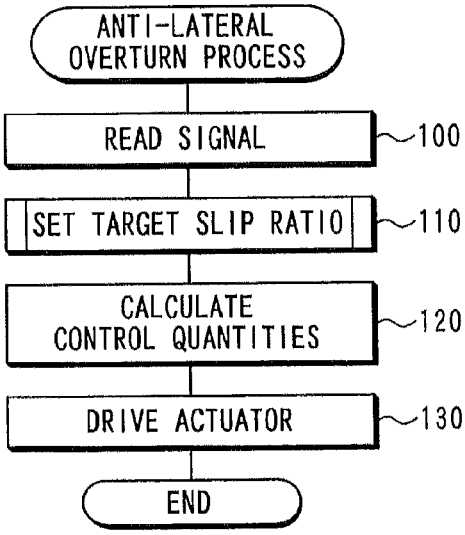
FIG. 3 is a flowchart showing anti-lateral overturn control which a brake ECU performs in accordance with a program.

FIG. 3 is a flowchart of an anti-lateral overturn control process, which is performed by the brake ECU 70. The anti-lateral overturn control process is performed repeatedly once per a predetermined calculation period after an ignition switch (not shown in the drawings) provided in the vehicle is turned on, or otherwise, while the vehicle is running.

First, at step 100, the brake ECU 70 reads several types of sensor signals. More specifically, the brake ECU 70 reads detection signals from the wheel speed sensors 71 to 74, the lateral acceleration sensor 75, and the like which are necessary for anti-lateral overturn control and then calculates several physical quantities. With this operation, the wheel speeds of the wheels FL to RR and the lateral acceleration Gy are calculated, and the vehicle speed (the estimated speed of the body of the vehicle) is calculated by means of a well-known method. In addition, the actual slip ratios Sa of the wheels FL to RR are calculated each of which is expressed by means of deviation (i.e. (vehicle speed−wheel speed)/vehicle speed) of the vehicle speed from a wheel speed. The lateral acceleration Gy sometimes become positive and sometimes become negative depending on, for example, whether they indicate left or right. The direction (left or right) corresponding to positive values can be determined arbitrarily.

Figure 4:
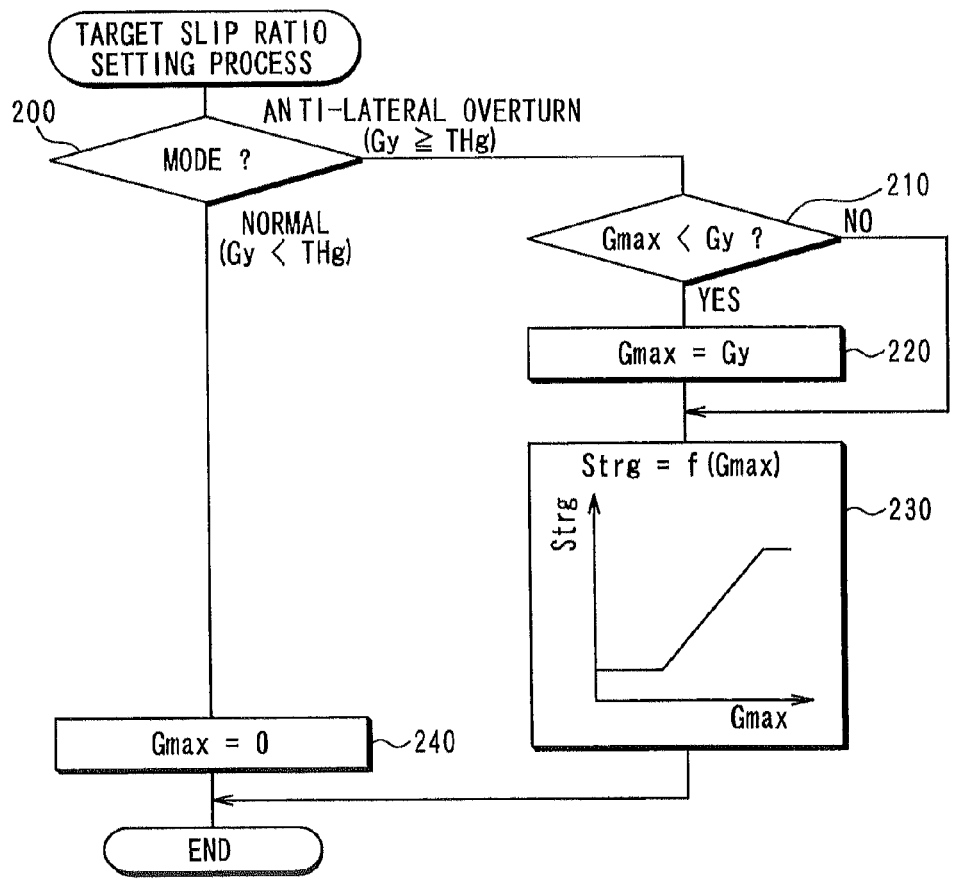
FIG. 4 is a flowchart showing a target slip ratio setting process.

Subsequently at step 110, the brake ECU 70 performs a target slip ratio setting process. FIG. 4 is a flowchart showing details of the target slip ratio setting process. Hereinafter, the target slip ratio setting process is described with reference to FIG. 4.

In the target slip ratio setting process, the brake ECU 70 first determines at step 200 whether to be in the anti-lateral overturn mode. More specifically, the brake ECU 70 determines whether the lateral acceleration Gy detected at step 100 is equal to or larger than a threshold THg (i.e. a motion state threshold), wherein the threshold THg is a reference value for determining whether the anti-lateral overturn control should be performed. The brake ECU 70 is thus an example of mode setting means for setting an anti-lateral overturn mode when the physical quantity obtained by the motion state obtaining means is larger than or equal to a motion state threshold. If the determination at step 200 is affirmative, the brake ECU 70 enters or remains in the anti-lateral overturn mode and then proceeds to step 210. More specifically, the brake ECU 70 enters the anti-lateral overturn mode if it is not in the anti-lateral overturn mode, and remains in the anti-lateral overturn mode if it is already in the anti-lateral overturn mode. If the determination at step 200 is negative, the brake ECU 70 enters or remains in a normal mode and then proceeds to step 240, wherein the normal mode is a mode in which the anti-lateral overturn control is not necessary.

At step 210, the brake ECU 70 determines whether the absolute value of the lateral acceleration Gy calculated in the present calculation period is larger than a largest value Gmax, wherein the largest value Gmax is equal to the largest value of the absolute value of the lateral acceleration Gy detected during a time range between the previous calculation period and a past time instance when the brake ECU 70 enters the anti-lateral overturn mode. If the determination at step 210 is affirmative, the brake ECU 70 proceeds to step 220 to update the largest value Gmax so that the largest value Gmax becomes equal to the absolute value of the lateral acceleration Gy calculated at the present calculation period and then proceeds to step 230. If the determination at step 210 is negative, the brake ECU 70 does not update the largest value Gmax and proceed to step 230. This operation makes it possible to keep updating and memorizing the largest value Gmax as the largest value of all absolute values of the lateral acceleration Gy detected during a time range between the present calculation period and a past time instance when the brake ECU 70 enters to the anti-lateral overturn mode.

At step 230, the brake ECU 70 performs a target slip ratio setting process in which a target slip ratio Strg is determined. The target slip ratio Strg is calculated as a value corresponding to the largest value Gmax. In the present embodiment, the target slip ratio Strg is obtained based on a map or a function expression Strg=f(Gmax) both of which indicates a correspondence between the largest value Gmax and the target slip ratio Strg. More specifically, the target slip ratio Strg becomes larger as the largest value Gmax becomes larger. However, a lower limit and an upper limit are defined for the target slip ratio Strg in the present embodiment. The brake ECU 70 sets the target slip ratio Strg to the lower limit when the largest value Gmax is smaller than a first predetermined value and sets the target slip ratio Strg to the upper limit when the largest value Gmax is equal to or larger than a second predetermined value which is larger than the first predetermined value.

Thus, the brake ECU 70 sets the target slip ratio Strg so that it becomes larger as the largest value Gmax becomes larger. Therefore, the brake ECU 70 actively generates slip and thereby keeps the vehicle skidding while the brake ECU 70 is in the anti-lateral overturn mode. The brake ECU 70 is thus an example of target slip ratio setting means for determining, when the vehicle motion control device is in the anti-lateral overturn mode, the target slip ratio at a present calculation period based on the largest value of the slip ratio corresponding (according to the predetermined relation) to the physical quantity obtained during a time range between the present calculation period and a past time instance when the vehicle motion control device enters the anti-lateral overturn mode.

On the other hand, the brake ECU 70 clears the largest value Gmax for the lateral acceleration Gy to zero at step 240 and then proceeds to step 120.

At step 120, the brake ECU 70 calculates control quantities based on the lateral acceleration Gy obtained at step 100. These control quantities are control quantities which is necessary to cause a wheel to be controlled to generate brake force and cause the actual slip ratio Sa of the vehicle to become equal to the target slip ratio Strg in order to suppress tendency to the lateral overturn of the vehicle. In other words, these control quantities may be amounts of electrical current supplied to the control valves 16 to 18, 21, 22, 36 to 38, 41, 42 and the motor 60. The amounts of electrical current may be duty cycles indicating current applying time per unit time, wherein the current applying time is a time length in which electrical current is supplied. The control quantities (or the amounts of current) are calculated based on the lateral acceleration Gy since the lateral acceleration Gy is proportional to the roll angle of the vehicle and therefore indicates tendency to the lateral overturn. For example, the control quantities (or the amounts of current) may be calculated based on a map or a function expression which are stored in advance in the brake ECU 70 and indicate a relation between the lateral acceleration Gy and each of the control quantities.

Since the brake ECU 70 can determine whether the vehicle is turning right or left based on whether the detected lateral acceleration Gy is positive or negative, the brake ECU 70 can designate the front outside wheel as the wheel to be controlled. The outside wheels are wheels at the opposite side of the direction of turning of the vehicle. In addition, the brake ECU 70 may further designate the rear outside wheel as one of the wheels to be controlled, if necessary. For example, the brake ECU 70 can determine whether to designate the front outside wheel as the solo wheel to be controlled or designate the front and rear outside wheels as the wheels to be controlled.

Subsequently, the brake ECU 70 proceeds to step 130 to perform an actuator driving process. The actuator driving process is performed in order to generate a brake force at the wheel(s) to be controlled. Therefore, in the actuator driving process, the amounts of the current to be supplied to the each of the valves 16 to 18, 21, 22, 36 to 38, 41, 42, and the motor 60 driving the pumps 19, 39 are controlled. Thus, the brake ECU 70 automatically pressurizes the W/Cs 14, 15, 34, 35 and thereby generates the brake forces. The brake ECU 70 then switches between the depressurization mode, the maintain mode, and the pressure boosting mode to adjust the W/C pressures. Therefore, the actual slip ratio Sa is controlled to the target slip ratio Strg and the lateral overturn is thereby suppressed.

Figure 8:
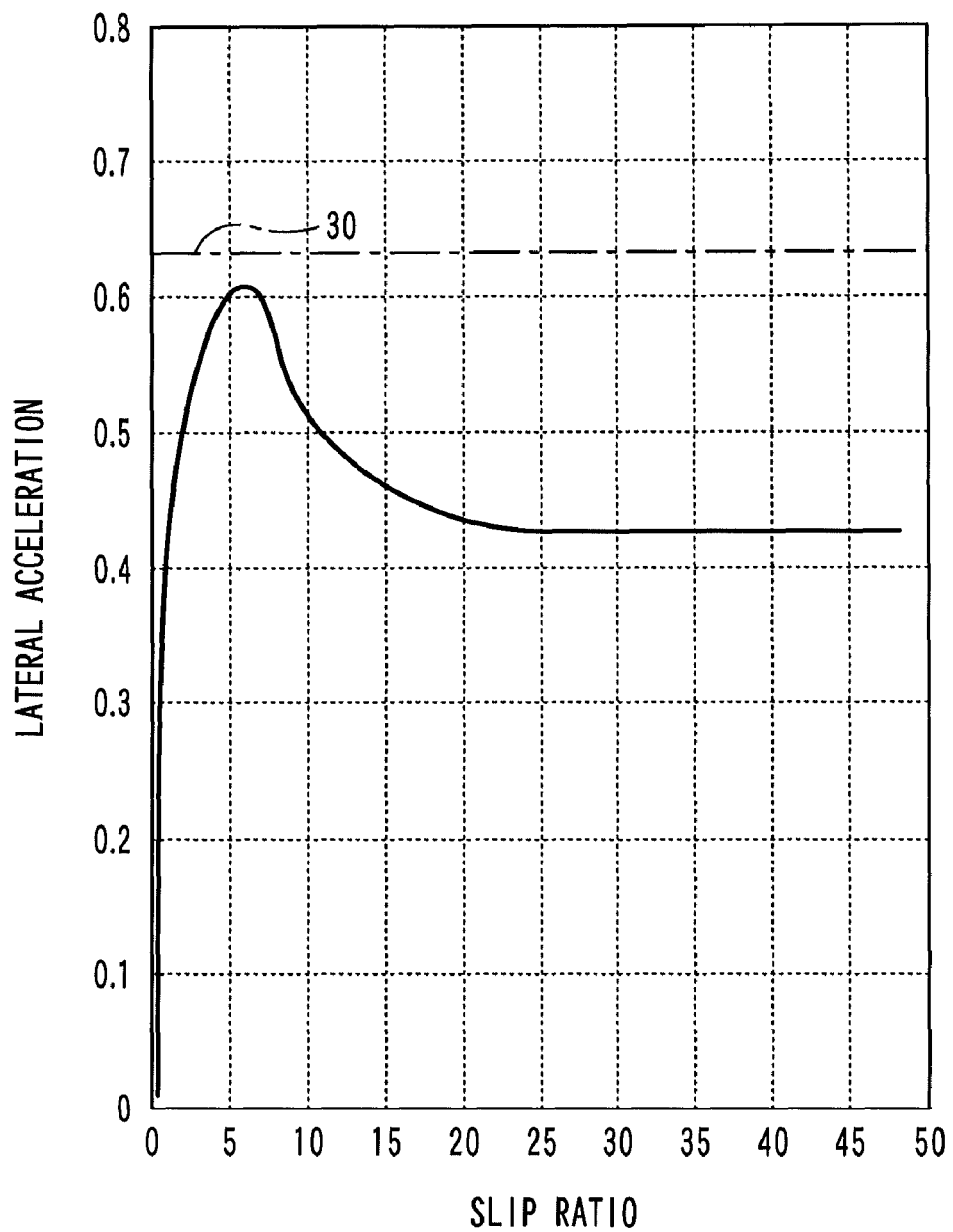
FIG. 8 is a graph showing a relation between a slip ratio and a lateral acceleration of a front outside wheel.
Figure 9:
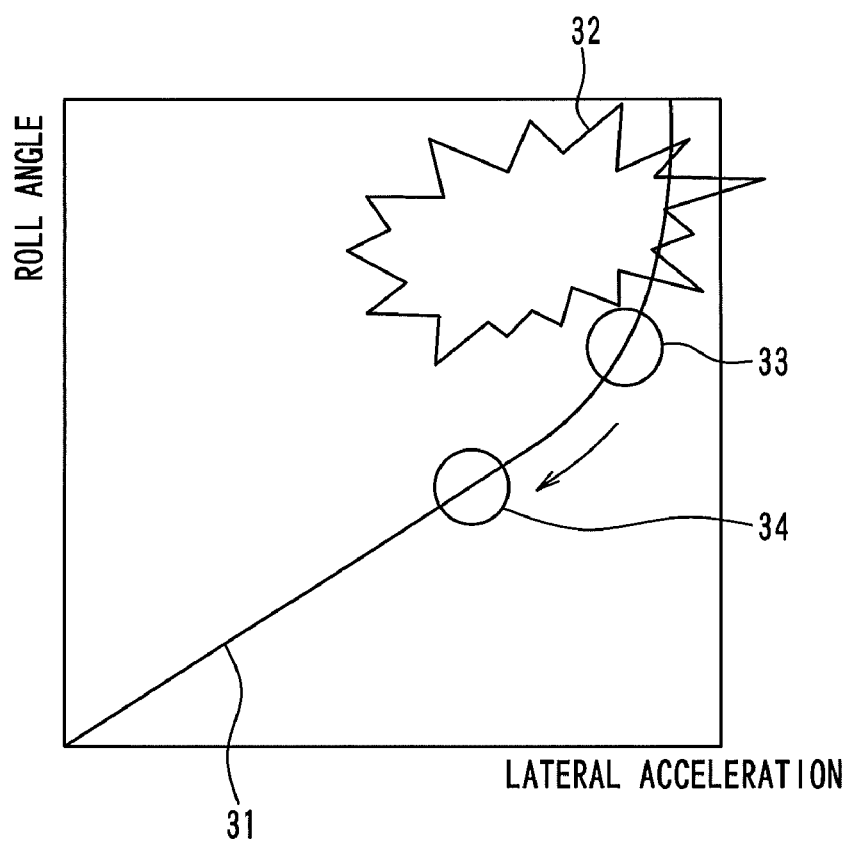
FIG. 9 is a graph showing the lateral acceleration and a roll angle.

As is described above, in performing the anti-lateral overturn control as an example of the vehicle motion control, the brake ECU 70 sets the target slip ratio Strg based on the largest value Gmax of the absolute value of the lateral acceleration Gy detected within the time range in which the brake ECU 70 is in the anti-lateral overturn mode. Therefore, when the actual slip ratio becomes closer to the target slip ratio Strg and the lateral acceleration Gy accordingly decreases (see FIG. 8), the target slip ratio Strg is not updated by the decreased lateral acceleration Gy. Therefore, the actual slip ratio can be maintained at a high value. Thus, the brake ECU 70 can actively generate lateral slip and thereby keep the vehicle skidding while the brake ECU 70 is in the anti-lateral overturn mode.

Therefore, it is possible to make an occasion unlikely in which decrease of the actual slip ratio causes the lateral acceleration Gy to increase and come closer to its peak value. Therefore, it is possible to make an occasion unlikely in which the roll angle reaches a roll limit value at which the lateral acceleration of the vehicle possibly occurs. Thus, it is possible to decrease possibility that the roll angle reaches the roll limit value 30 and enhance the effect of anti-lateral overturn control.

Second Embodiment

Hereinafter, a second embodiment of the present invention is described. In the present embodiment, a method for setting the target slip ratio Strg is different from that in the first embodiment, but other features are the same as the first embodiment. Accordingly, only the different points will be described.

In the brake control system 1 of the present embodiment, the brake ECU 70 performs the anti-lateral overturn control which is the same as that of the first embodiment except for that the target slip ratio setting process in the present embodiment sets the target slip ratio Strg based on the largest value Gmax and the total weight of the vehicle. The total weight of the vehicle can be detected by detection signals from load sensors 76 in FIG. 2 which are located at the suspensions or the like of the vehicle.

Figure 5:
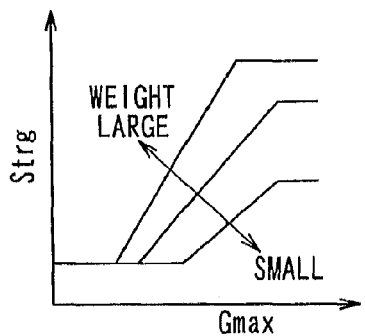
FIG. 5 is a map showing an example of a relation between a largest value Gmax, a total weight of the vehicle and a target slip ratio Strg, wherein the map is used in a target slip ratio setting process in an anti-lateral overturn control according to a second embodiment of the present invention.

FIG. 5 is a map showing an example of a relation of the target slip ratio Strg to the largest value Gmax and the total weight of the vehicle, which are used in the target slip ratio setting process within the anti-lateral overturn control performed by the brake ECU 70 in the present embodiment.

As shown in FIG. 5, the methods for calculating the target slip ratio Strg is similar to that in the first embodiment in that the target slip ratio Strg becomes larger as the largest value Gmax becomes larger. However, the target slip ratio Strg becomes larger as the total weight of the vehicle becomes larger in the method of the present embodiment. Since the peak value of the lateral acceleration shown in FIG. 8 becomes larger as the total weight of the vehicle becomes larger, the vehicle comes to have greater tendency to the lateral overturn as the total weight of the vehicle becomes larger. Therefore, the brake ECU 70 sets the target slip ratio Strg depending on the total weight, more specifically, sets the target slip ratio Strg based on a map (or a function) indicating a relation in which the target slip ratio Strg becomes larger as the total weight of the vehicle becomes larger with the largest value Gmax fixed.

Thus, by changing the relation between the lateral acceleration Gy and the target slip ratio Strg based on the total weight of the vehicle, it becomes possible to set the target slip ratio Strg which is more suitable for the total weight of the vehicle. As a result, the effect of the anti-lateral overturn control becomes satisfactory even if the total weight of the vehicle is large.

Third Embodiment

Hereinafter, a third embodiment of the present invention is described. In the present embodiment, a method for setting the target slip ratio Strg is different from that in the first embodiment, but other features are the same as the first embodiment. Accordingly, only the different points will be described.

In the first embodiment, the brake ECU 70 calculates the target slip ratio Strg in accordance with the largest value Gmax of the absolute value of the lateral acceleration Gy detected after entering the anti-lateral overturn mode, by using the map or the function expression which is predetermined as a relation between the largest value Gmax and the target slip ratio Strg. In contrast, the brake ECU 70 in the present embodiment sets the target slip ratio Strg based on the actual slip ratio Sa which occurs when the absolute value of the lateral acceleration Gy becomes the largest value Gmax.

Figure 6:
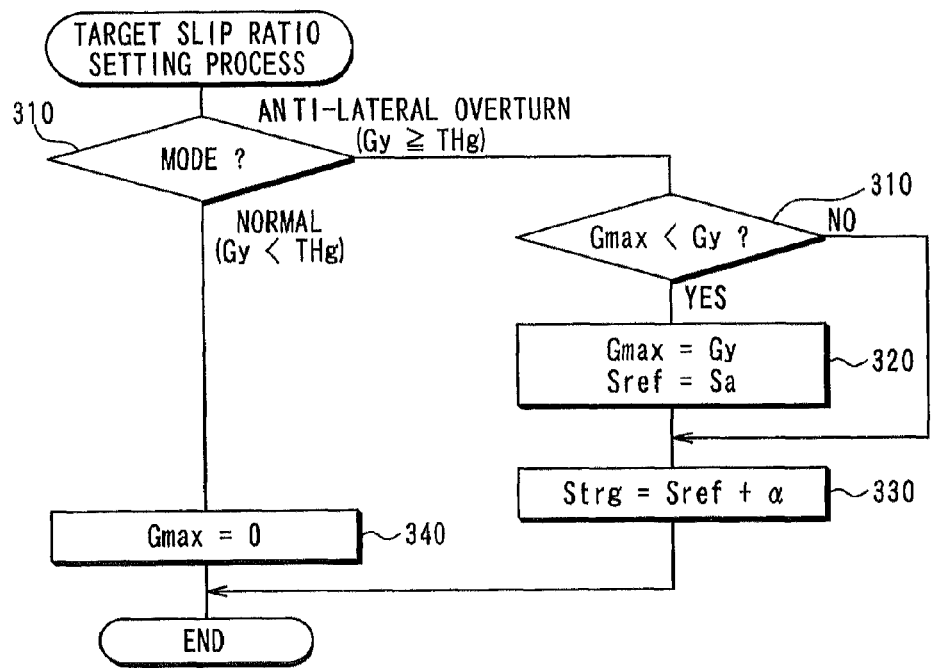
FIG. 6 is a flowchart showing a target slip ratio setting process in a anti-lateral overturn control according to a third embodiment of the present invention.

In the brake control system 1 of the present embodiment, the brake ECU 70 performs the anti-lateral overturn control which is the same as that of the first embodiment except for that the target slip ratio setting process in the present embodiment is shown as a flowchart not in FIG. 4 but in FIG. 6.

FIG. 6 is a flowchart showing a target slip ratio setting process in the anti-lateral overturn control performed according to a program by the brake ECU 70 of the brake control system 1 according to the present embodiment. The flowchart in FIG. 6 can be composed by modifying steps 220 and 230 in the flowchart in FIG. 4 in the first embodiment.

More specifically, although the brake ECU 70 performs at steps 300, 310 and 340 the same process as the steps 200, 210 and 240 respectively, the brake ECU 70 performs in steps 320 and 330 different processes from steps 220 and 230 respectively. At step 320 which is executed when the absolute value of the lateral acceleration Gy detected at the present calculation period is equal to or larger than the largest value Gmax currently memorized, the brake ECU 70 updates the largest value Gmax to the absolute value of the lateral acceleration detected at the present calculation period and stores the actual slip ratio Sa detected at the present calculation period as a reference slip ratio Sref. Then the brake ECU 70 proceeds to step 330 to calculate the target slip ratio Strg based on the reference slip ratio Sref stored at step 320. Here, the target slip ratio Strg is a sum of the reference slip ratio Sref and a predetermined value α.

Thus, the target slip ratio Strg can be set based on the reference slip ratio Sref which is the actual slip ratio Sa generated when the absolute value of the lateral acceleration Gy becomes the largest value Gmax. With this operation, even if the lateral acceleration Gy decreases as the actual slip ratio becomes closer to the target slip ratio Strg, the actual slip ratio can be maintained at high values since the target slip ratio Strg can be fixed to a value based on the reference slip ratio Sref which is the actual slip ratio Sa occurring when the absolute value of the lateral acceleration Gy becomes the largest value Gmax. Therefore, the brake ECU 70 actively generates lateral slip and thereby keeps the vehicle skidding. Thus, the present embodiment achieves an advantageous effect similar to that in the first embodiment.

Fourth Embodiment

Hereinafter, a fourth embodiment of the present invention is described. In the present embodiment, a method for setting the target slip ratio Strg is different from that in the first embodiment, but other features are the same as the first embodiment. Accordingly, only the different points will be described.

In the first to third embodiments, the brake ECU 70 calculates in advance the largest value Gmax of the absolute value of the lateral acceleration Gy and then sets the target slip ratio Strg to a value corresponding to the largest value Gmax or to a value corresponding to the reference slip ratio Sref which is the actual slip ratio Sa occurring when the absolute value of the lateral acceleration Gy becomes the largest value Gmax. In contrast, the brake ECU 70 in the present embodiment calculates, when the lateral acceleration Gy is detected, a temporary slip ratio Stmp based on the detected lateral acceleration Gy and sets the target slip ratio Strg to the largest value Smax of the temporary slip ratio.

Figure 7:
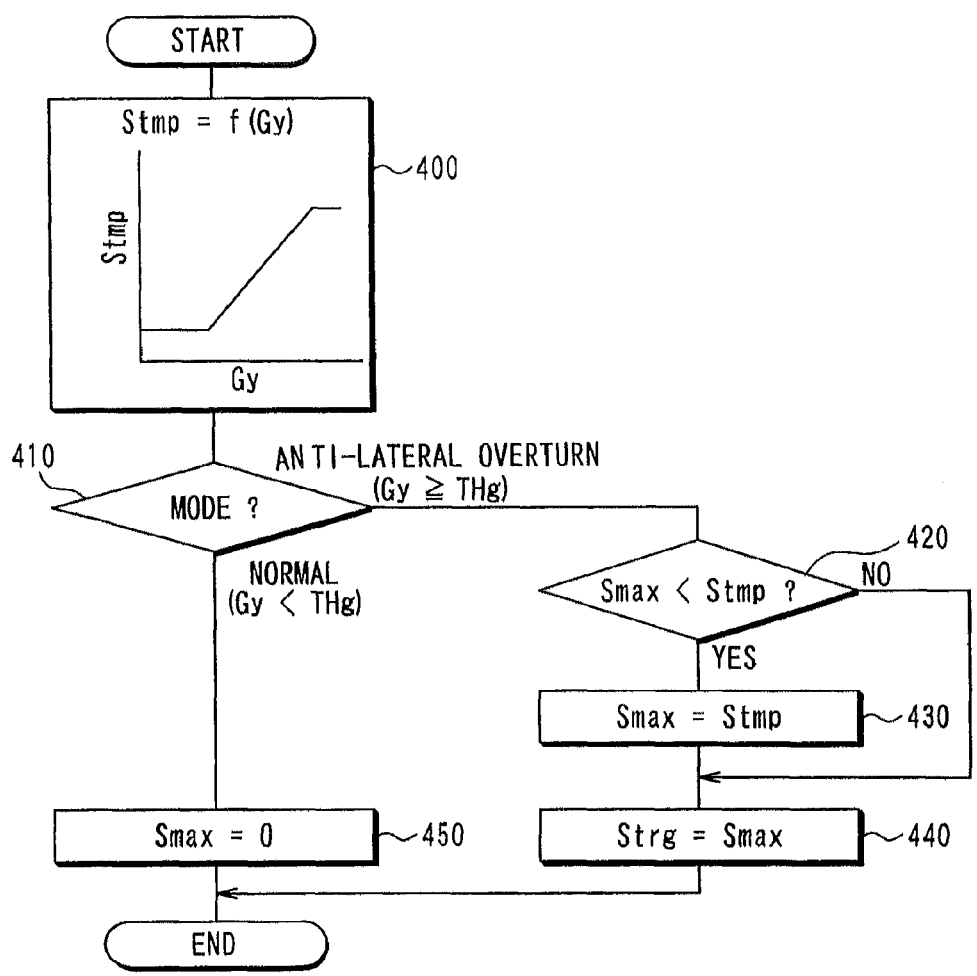
FIG. 7 is a flowchart showing a target slip ratio setting process in a anti-lateral overturn control according to a fourth embodiment of the present invention.

In the brake control system 1 of the present embodiment, the brake ECU 70 performs the anti-lateral overturn control which is the same as that of the first embodiment except for that the target slip ratio setting process in the present embodiment is shown as a flowchart not in FIG. 4 but in FIG. 7.

FIG. 7 is a flowchart showing a target slip ratio setting process in the anti-lateral overturn control performed according to a program by the brake ECU 70 of the brake control system 1 according to the present embodiment. This process is also performed repeatedly once per a predetermined calculation period when the ignition switch (not shown in the drawings) provided in the vehicle is turned on, or otherwise, while vehicle is running.

First, the brake ECU 70 calculates at step 400 the temporary slip ratio Stmp corresponding to the absolute value |Gy| of the lateral acceleration Gy detected at the latest step 100. in the present embodiment, the temporary slip ratio Stmp is calculated based on a map or a function expression Stmp=f (Gy) which indicate a relation between the absolute value |Gb| of the lateral acceleration Gy and the temporary slip ratio Stmp. More specifically, the temporary slip ratio Stmp becomes larger as the absolute value |Gy| becomes larger. However, a lower limit and an upper limit are defined for the temporary slip ratio Stmp in the present embodiment. The brake ECU 70 sets the temporary slip ratio Stmp to the lower limit when the absolute value |Gy| is smaller than a first predetermined value and sets the temporary slip ratio Stmp to the upper limit when the absolute value |Gy| is equal to or larger than a second predetermined value which is larger than the first predetermined value.

Subsequently at step 410, the brake ECU 70 determines whether to be in the anti-lateral overturn mode or the normal mode in the same manner as step 200 in FIG. 4. If the brake ECU 70 determines to be in the anti-lateral overturn mode, the brake ECU 70 enters or remains in the anti-lateral overturn mode and proceeds to step 420 to determine whether the temporary slip ratio Stmp calculated at the present calculation period is larger than the largest value Smax of the temporary slip ratio Stmp calculated in the time range between the previous calculation period and a past time instance when brake ECU 70 enters the anti-lateral overturn mode. If the determination at step 420 is affirmative, the brake ECU 70 proceeds to step 430 to update the largest value Smax so that the largest value Smax becomes equal to the temporary slip ratio Stmp calculated at the present calculation period and then proceeds to step 440. If the determination at step 420 is negative, the brake ECU 70 does not update the largest value Smax and proceed to step 440. This operation makes it possible to keep updating and memorizing the largest value Smax as the largest value of the temporary slip ratio Stmp calculated during a time range between the present calculation period and a past time instance when the brake ECU 70 enters the anti-lateral overturn mode.

At step 440, the brake ECU 70 performs a target slip ratio setting process in which a target slip ratio Strg is determined. The target slip ratio Strg is calculated so that it becomes equal to the largest value Smax. Thus, the brake ECU 70 keeps updating the target slip ratio Strg by using the largest value of the target slip ratio Strg in the time range between the present calculation period and a past time instance when the brake ECU 70 enters the anti-lateral overturn mode. Subsequently, the brake ECU 70 proceeds to step 120 in FIG. 3.

If the brake ECU 70 determines at step 410 to be in the normal mode, the brake ECU 70 enters or remains in the normal mode and proceeds to step 450 to clear the largest value Smax of the temporary slip ratio Stmp to zero and then proceeds to step 120 in FIG. 3.

Afterwards, by executing step 120 and 130 in FIG. 3, the brake ECU 70 can perform the anti-lateral overturn control as is done in the first embodiment.

Other Embodiments (1) In the above embodiments, the lateral acceleration Gy is used as an example of a physical quantity representing a state of the motion of the vehicle in the direction of the lateral overturn. The brake ECU 70 is an example of motion state obtaining means for obtaining, once per a predetermined calculation period, the physical quantity representing the state of the motion of the vehicle in the direction of the lateral overturn. However, another quantity can be used as the physical quantity representing a state of the motion of the vehicle in the direction of the lateral overturn. For example, the brake ECU 70 may detect the roll angle of the vehicle directly by means of the roll angle sensor and use the detected roll angle as the physical quantity representing a state of the motion of the vehicle in the direction of the lateral overturn. In addition, the brake ECU 70 may detect a turning direction of the vehicle and a degree of a tendency for the lateral overturn of the vehicle based on the steering angle corresponding to an amount of operation which is performed by a driver to a steering handle and the actual yaw rate actually being generated at the vehicle, wherein the steering angle and the actual yaw rate can be detected by means of a steering angle sensor and a yaw rate sensor. For example, the turning direction can be determined directly from the steering angle. The degree of the tendency for the lateral overturn of the vehicle can be represented by a difference between a target yaw rate and the actual yaw rate detected by the yaw rate sensor, wherein the target yaw rate can be estimated based on the steering angle and the lateral acceleration by using a well-known method.

(2) When the brake ECU 70 is in the anti-lateral overturn mode, the brake ECU 70 in the first, second and fourth embodiments determines the target slip ratio at the present calculation period based on the largest value of the slip ratio corresponding, according to the predetermined relation between the slip ratio and the physical quantity representing a state of motion of the vehicle in a direction of lateral turnover, to the physical quantity obtained during the time range between the present calculation period and a past time instance when the vehicle motion control device enters the anti-lateral turnover mode. The brake ECU 70 is thus an example of a basic means for determining a target slip ratio based on a predetermined relation between a slip ratio of a wheel of a vehicle and a physical quantity representing a state of motion of the vehicle in the direction of lateral overturn of the vehicle and also for controlling an actual slip ratio so that the actual slip ratio becomes equal to the target slip ratio, the actual slip ratio being a slip ratio actually generated at the wheel of the vehicle.

For example, in the first and second embodiments, the brake ECU uses a first method for calculating the target slip ratio Strg. More specifically, the brake ECU 70 uses a relation between the target slip ratio Strg and the largest value Gmax of the absolute value of the lateral acceleration Gy in the anti-lateral turnover mode and thereby sets the target slip ratio Strg at the present calculation period based on the largest value Gmax. Thus, the brake ECU 70 in the first and second embodiments uses the first method for calculating the target slip ratio Strg.

In the fourth embodiment, the brake ECU 70 uses the relation between the lateral acceleration Gy and the temporary slip ratio Stmp and thereby calculates the temporary slip ratio Stmp every time when the lateral acceleration Gy is detected. Therefore, the temporary slip ratio Stmp is calculated even when the brake ECU 70 is not in anti-lateral overturn mode. However, the calculated temporary slip ratio Stmp is used only when the brake ECU 70 is in the anti-lateral overturn mode. Therefore, the largest value Smax of the temporary slip ratio Stmp corresponding to the lateral acceleration Gy obtained in the anti-lateral overturn mode becomes the target slip ratio Strg. Therefore, the brake ECU 70 in the fourth embodiment also uses the first method for calculating the target slip ratio Strg.

However, it should be noted that just an example of the first method for calculating the target slip ratio Strg is described in each of the first, second and fourth embodiments. Therefore, another method belonging to the first method may be used to calculate the target slip ratio Strg. For example, the brake ECU 70 may calculate the lateral acceleration Gy as in the fourth embodiment, then calculate, only in the anti-lateral overturn mode, the temporary slip ratio Stmp based on the relation between the temporary slip ratio Stmp and the lateral acceleration Gy, and then set the target slip ratio Strg to the largest value Smax of the temporary slip ratio Stmp.

(3) In the above embodiments, the brake ECU 70 uses, in calculating the target slip ratio Strg (or the temporary slip ratio Stmp) corresponding to the lateral acceleration Gy, the relation between the target slip ratio Strg and the largest value Gmax of the absolute value of the lateral acceleration Gy or the relation between the temporary slip ratio Stmp and the absolute value |Gy| of the lateral acceleration Gy. Thus, the brake ECU 70 uses not the lateral acceleration Gy itself but the absolute value of the lateral acceleration Gy as a measure against the fact that the lateral acceleration Gy sometimes has a positive value and sometimes has a negative value. However, even if the lateral acceleration Gy sometimes has a positive value and sometimes has a negative value, ECU 70 may use the lateral acceleration Gy itself if the relation between the target slip ratio Strg (or the temporary slip ratio Stmp) and the lateral acceleration Gy is defined distinctively both in the case that the lateral acceleration is positive and in the case that the lateral acceleration is negative.

(4) In the second embodiment, the relation between the target slip ratio Strg and the largest value Gmax of the absolute value of the lateral acceleration Gy varies depending on the total weight of the vehicle. A similar manner can be also applied to the third and fourth embodiments. For example, in the third embodiment, the brake ECU 70 may change the predetermined value α based on the total weight of the vehicle. More specifically, the brake ECU 70 may set the target slip ratio Strg depending on the total weight of the vehicle by changing the predetermined value α so that the predetermined value α becomes larger as the total weight of the vehicle becomes larger. In the fourth embodiment, the brake ECU 70 may change the relation between the temporary slip ratio Stmp and the lateral acceleration Gy based on the total weight of the vehicle. For example, the temporary slip ratio Stmp may be set so that it becomes larger as the lateral acceleration Gy becomes larger and also becomes larger as the total weight of the vehicle becomes larger, in the similar manner to that of FIG. 5.

(5) Each of the steps shown in the drawings corresponds to a means for executing a process in the step. For example, in FIGS. 4, 6 and 7, step 100 corresponds to a motion state obtaining means, each of steps 200, 300, 410 corresponds to a mode setting means, each of steps 230, 330, 430 corresponds to a target slip ratio setting means, and step 400 corresponds to a temporary target slip ratio setting means.

What is claimed is:

1. A vehicle motion control device, comprising:
   a basic means for determining a target slip ratio based on a predetermined relation between a slip ratio of a wheel of a vehicle and a physical quantity representing a state of motion of the vehicle in a direction of lateral overturn of the vehicle and also for controlling an actual slip ratio so that the actual slip ratio becomes equal to the target slip ratio, the actual slip ratio being a slip ratio actually generated at the wheel of the vehicle;
   a motion state obtaining means for obtaining, once per a predetermined calculation period, the physical quantity representing the state of the motion of the vehicle in the direction of the lateral overturn; and
   a mode setting means for being in an anti-lateral overturn mode when the physical quantity obtained by the motion state obtaining means is larger than or equal to a motion state threshold, the anti-lateral overturn mode being for suppressing the lateral overturn of the vehicle; wherein
   the basic means includes a target slip ratio setting means for determining, when the vehicle motion control device is in the anti-lateral overturn mode, the target slip ratio at a present calculation period based on a largest value of the slip ratio corresponding to the physical quantity obtained during a time range, the time range being between the present calculation period and a past time instance when the vehicle motion control device was in the anti-lateral overturn mode.

2. The vehicle motion control device according to claim 1, wherein
   the predetermined relation relates the slip ratio to the physical quantity so that the slip ratio becomes larger as an absolute value of the physical quantity becomes larger, when the vehicle motion control device is in the anti-lateral overturn mode, the target slip ratio setting means obtains a largest value of the absolute value of the physical quantity obtained during the time range and determines the target slip ratio at a present calculation period to be the slip ratio corresponding to the obtained largest value of the absolute value of the physical quantity.

3. The vehicle motion control device according to claim 1, wherein
   the predetermined relation relates the slip ratio to the physical quantity so that the slip ratio becomes larger as an absolute value of the physical quantity becomes larger,
   the vehicle motion control device further comprising a temporary target slip ratio setting means for setting, each time when the physical quantity is obtained by the motion state obtaining means, a temporary target slip ratio to a slip ratio corresponding to the obtained the physical quantity, and
   the target slip ratio setting means sets, when the vehicle motion control device is in the anti-lateral overturn mode, the target slip ratio to a largest value of the temporary target slip ratio set by the temporary target slip ratio setting means during the time range.

4. The vehicle motion control device according to claim 1, wherein the predetermined relation relates the slip ratio to the physical quantity so that the target slip ratio becomes larger as a total weight of the vehicle becomes larger with the physical quantity fixed.

5. The vehicle motion control device according to claim 2, wherein the predetermined relation relates the slip ratio to the physical quantity so that the target slip ratio becomes larger as a total weight of the vehicle becomes larger with the physical quantity fixed.

6. The vehicle motion control device according to claim 3, wherein the predetermined relation relates the slip ratio to the physical quantity so that the target slip ratio becomes larger as a total weight of the vehicle becomes larger with the physical quantity fixed.

7. A vehicle motion control device, comprising:
   a basic means for determining a target slip ratio based on an actual slip ratio being actually generated at a wheel of a vehicle and a physical quantity representing a state of motion of the vehicle in a direction of lateral overturn of the vehicle and also for controlling the actual slip ratio so that the actual slip ratio becomes equal to the target slip ratio;
   a motion state obtaining means for obtaining, once per a predetermined calculation period, the physical quantity and the actual slip ratio actually being generated at the wheel of the vehicle; and
   a mode setting means for being in an anti-lateral overturn mode when the physical quantity obtained by the motion state obtaining means is larger than or equal to a motion state threshold, the anti-lateral overturn mode being for suppressing the lateral overturn of the vehicle; wherein
   the basic means includes a target slip ratio setting means for setting, when the vehicle motion control device is in the anti-lateral overturn mode, a reference slip ratio to the actual slip ratio obtained when the physical quantity reaches a largest value within a time range, the time range being between the present calculation period and a past time instance when the vehicle motion control device is in the anti-lateral overturn mode, and also for determining the target slip ratio at the present calculation period based on the reference slip ratio.

8. The vehicle motion control device according to claim 7, wherein the target slip ratio setting means sets the target slip ratio to the sum of the reference slip ratio and a predetermined value.

9. The vehicle motion control device according to claim 8, the predetermined value becomes larger as a total weight of the vehicle becomes larger.

* * * * *